Figure 1:
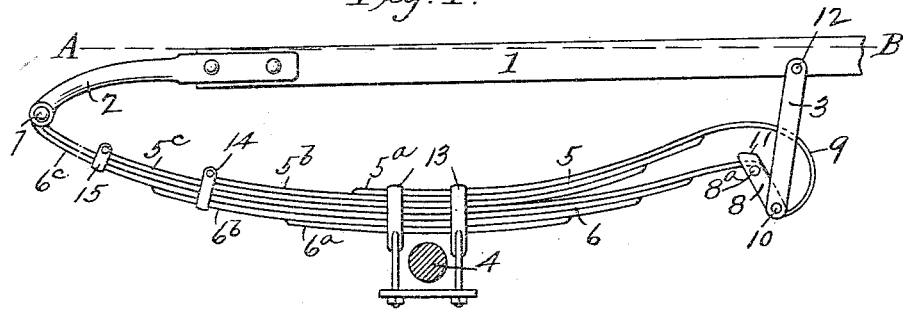

M. M. McINTYRE.
VEHICLE SPRING.
APPLICATION FILED OCT. 29, 1906.

1,135,036.

Patented Apr. 13, 1915
2 SHEETS—SHEET 1.

Witnesses:
A. L. Lord.
W. L. McGarrell.

Inventor.
Michael M. McIntyre
By Bates, Fouts & Hull
Attorneys.

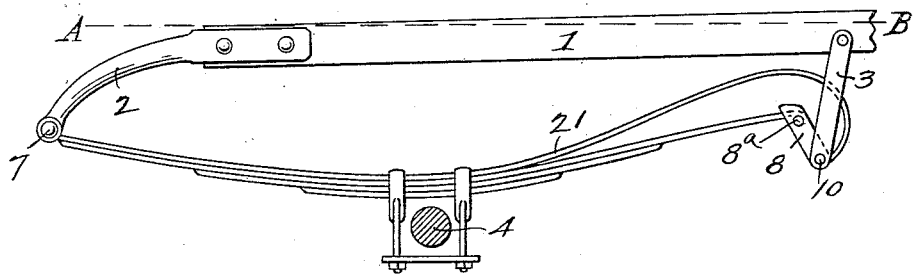
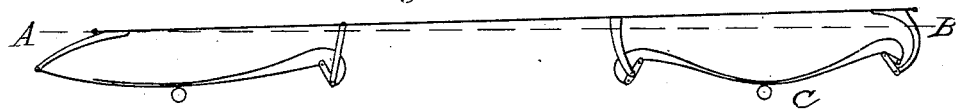

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

1,135,036.

Specification of Letters Patent.

Patented Apr. 13, 1915.

Application filed October 29, 1906. Serial No. 340,938.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

My invention relates to vehicle springs, and has for its object to secure ease of riding with rigidity of traction between the axle and vehicle body or frame as well as to secure even motion of the frame; also to provide a form of spring embodying these characteristics that may be readily attached to vehicles as ordinarily constructed with little or no alteration in the hangers or frame thereof to accommodate the spring. I secure these results by the construction shown in the drawings, and set forth in the specification and claims forming part hereof.

Figure 2:
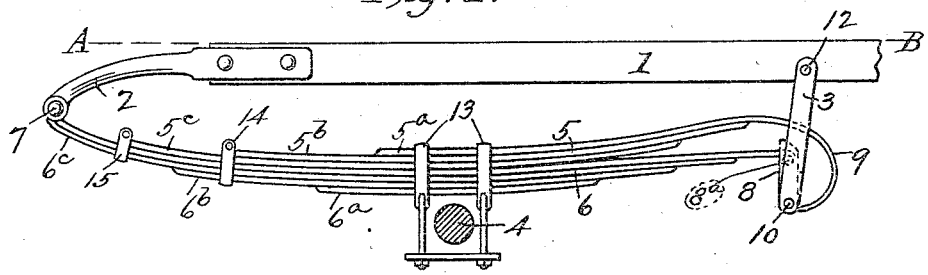
Figure 3:
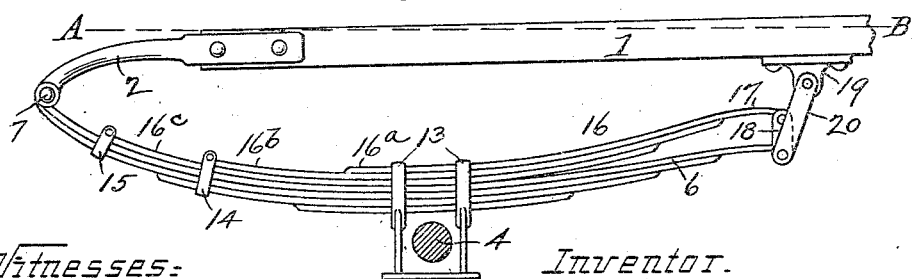

In the drawings, Figure 1 represents a side elevation showing a spring constructed in accordance with my invention attached to the frame of a vehicle, the spring being shown in the position which it occupies when subjected only to the weight of the vehicle; Fig. 2 represents a similar view showing the spring deflected by having applied thereto the maximum weight which it is designed to carry; Fig. 3 represents a view, similar to Fig. 1, of a modification of the spring shown in the preceding view; Fig. 4 represents a view similar to Fig. 3 of a further modification of a spring embodying my invention and Figs. 5, 6, and 7 represent diagrammatic views illustrating the position assumed by the vehicle frame under various conditions of load, when springs constructed in accordance with my invention are applied thereto.

Describing by reference characters the spring shown in Figs. 1 and 2, 1 represents the lower side frame of a vehicle, provided with a hanger 2 and a shackle 3. 4 denotes the axle of the vehicle, and 5 and 6 the two individual spring members which comprise the complete spring. One of these members, 6, is a semi-elliptic spring, one end of which is connected directly to the vehicle frame by means of a pin or bolt 7 extending through the eye of the spring and the end of the hanger 2. The opposite end of the spring 6 is connected in like manner to the upper end of a shackle 8 by means of a pin or bolt 8ª, the shackle 8 being pivotally connected at the lower end thereof to the lower end of the long shackle 3, the upper end of which may be pivoted to the frame 1. The other spring member consists of the spring 5 having a scroll end 9 extending around the adjacent end of spring 6 and being connected by a pin or bolt 10 with the lower ends of shackles 3 and 8. The upper end of shackle 8 is extended above the main leaf of spring 6 and provided with a stop 11 to engage said spring 6 and prevent the capsizing of the shackle 8 on rebound, as fully set forth in an earlier application of mine, Serial No. 314,805 filed May 2nd, 1906. The parts are so proportioned that, when no load is on the vehicle, the pin 10 is inside of a vertical line drawn through the pin or bolt 12 by which the upper end of the shackle 3 is secured to the frame and the pin 8ª is inside of a vertical line drawn through pin or bolt 10. When the spring is loaded to its capacity, the parts assume the positions shown in Fig. 2, that is to say, the shackle 8 has been rotated by the expansion of the semi-elliptic spring and the contraction of the scroll until the pivots 8ª and 10 are in the same vertical line while 10 is slightly inside of a vertical line drawn through 12.

As will appear from the drawings, but one end of the complete spring is provided with a scroll, the other end consisting of a semi-elliptic spring member reinforced by the end portions of the individual leaves of the scroll spring member. The upper or main leaf 5ª of the scroll spring member extends sufficiently beyond the center of the semi-elliptic spring member to be engaged by both of the clips 13, which secure the spring members to the axle 4. The end of the second leaf 5ᵇ of the scroll spring member projects considerably beyond the end of 5ª nearly as far beyond the axle as does the opposite end and is secured to the spring member 6 by means of a clip 14.

The leaf 5ᶜ of the scroll spring member extends considerably beyond the corresponding end of 5ᵇ, nearly to the hanger 2, and is secured to the main leaf of the semi-elliptic spring by means of a clip 15. While I have shown the scroll spring member as a three-leaf spring, it will be obvious that more leaves may be employed if necessary to support the load, but in any event the ends of the leaves on the side of the axle opposite to the scroll should be staggered with respect to the corresponding ends of the leaves of the semi-elliptic spring member and evenly spaced therebetween. That is to say, the end of leaf $5^b$ should be half-way between the subjacent ends of the leaves $6^a$ and $6^b$ of the semi-elliptic spring member and the end of leaf $5^c$ should be half-way between the subjacent ends of leaves $6^b$ and $6^c$. This results in a uniform diminution of metal from the axle to the hanger 2, with a corresponding uniform yielding of the spring from the axle to the said hanger. This end of the spring is stronger and less yielding than the other end, making the spring particularly well adapted to automobiles. As is well known, the major portion of the load put into automobiles is carried at the rear thereof. By having the rear portion of the spring more tender or resilient than the front, the load at the rear portion of the auto is uniformly distributed between three points (the two ends of the rear end and the rear end of the front spring) the front end of the front spring serving as a yielding or movable pivot for the frame, as will be explained in connection with the diagrammatic views in Figs. 5 and 7.

By connecting the end of the semi-elliptic spring to the hanger 2, I attain a rigid traction between the body of the vehicle and the axle. Terminating the end of the main leaf $5^a$ of the scroll spring member just beyond the axle reduces the mass of steel below this member at what would be the central portion thereof if it were a scroll spring of ordinary construction and makes the portion of this spring member which is flexibly connected to shackle 3 more resilient than would be the case if it were a complete scroll spring. At the same time, the strength of the half of the semi-elliptic spring on the side of the axle opposite the scroll is not sacrificed by virtue of this construction. Furthermore, the tendency of the front end of the lower spring 6 to rebound beyond its normal arch is resisted by the lesser arch given to the spring ends $5^a$, $5^b$ and $5^c$, while the tendency of such main plate to separate on rebound from the subjacent leaves is resisted by the greater arch which is given to these leaves in building the spring 6. This makes the front end of spring 6 particularly durable.

In the modification shown in Fig. 3, I employ, for the upper spring member, a portion of a semi-elliptic spring in the same manner as I employ for the upper spring member in the preceding figures a portion of a scroll spring. In this figure, 16 denotes the upper spring member, the end 17 of which is flexibly connected to the end of the lower spring member 6 by means of a shackle 18. The ends of the lower spring member are connected to the frame 1 by means of the hangers 2 and 19 and a long shackle 20. It should be noted that a slight sweep is given to the end 17. The shackle 18 permits of relative movement between the end 17 and the subjacent end of spring 6 while the shackle 20 permits of a free movement of the ends of both spring members. The ends of the leaves $16^a$, $16^b$, and $16^c$ are connected to the subjacent portions of the other spring members 6 in the same manner as are the ends of the corresponding leaves of the spring 5 shown in Figs. 1 and 2.

In Fig. 4, I have shown a modification which resembles the form of spring shown in Figs. 1 and 2 in general appearance. In this figure, however, only the main leaf 21 of a scroll spring is employed with the semi-elliptic spring. The connections between the end of the scroll and the adjacent end of the semi-elliptic spring and between the ends of the latter spring and the hanger shackle are the same as in Figs. 1 and 2. The opposite end of the scroll spring however is extended and is provided with an eye by which it is connected to hanger 2. The main leaf of the semi-elliptic spring extends substantially as far as the hanger 2 and reinforces the leaf of spring 21. In this construction, as in the construction shown in Figs. 1 and 2, the end of the spring which is flexibly connected with the vehicle is formed by combining a scroll spring member with a semi-elliptic spring member, while the other end of the spring, which is rigidly attached to the hanger, comprises a semi-elliptic spring member. It will be noted that, in the various embodiments of my invention shown herein, the spring members are constructed without any considerable bow or arch. This brings the axle close to the frame and thus prevent side swaying of the vehicle, as the edges of the springs effectually resist this motion.

It will be seen further that the front end of the various forms of springs is in a higher plane than the rear end, and I am enabled to employ with the front end of each of the forms of spring shown herein the ordinary short hanger which is provided for vehicle frames, dispensing with the necessity for any special form of hanger for this end of my spring, while the employment of the long shackle at the rear end dispenses with the necessity for any special form of hanger at that end of the spring.

As previously stated, the front end of the spring is stronger and less yielding than the rear end. This is of great advantage in securing a uniform distribution of load to the rear end of these springs and the ends of the rear springs, particularly when such rear springs are double springs of the type shown in the diagrammatic views in Figs. 5, 6 and 7. In these figures, A B represent a horizontal line extending through the front end of the frame. C represents the type of rear spring which may be employed with the vehicle, said type being shown as a double spring consisting of an upper scroll spring and a lower semi-elliptic spring, the ends of which are flexibly connected together by means of links, as shown in an earlier application. I prefer to so construct and connect the springs that, when no load has been added to the vehicle, the rear end of the frame will be slightly above the front end thereof. Fig. 6 represents the position of the frame when the vehicle has therein the ordinary full load which the springs are designed to carry. In this position, the direction of the frame coincides with the horizontal line A B,—the frame acting under load as if it were pivoted at the front end thereof. In Fig. 7, the frame is shown in the position which it occupies when the springs are under extreme deflection, such deflection being produced either by overload or by striking an obstacle, or both. In this case the rear end of the frame is somewhat below the horizontal line A B. The stiffness of the front ends of the front springs and the rigid connection between the same and the front axle enable the frame to assume these positions, as under load or on striking an obstruction the rear end of the frame yields more readily than the front end. The rear end of the front spring, being more tender or resilient than the front end thereof, yields also and permits the portion of the frame supported thereby to be depressed, as will appear more particularly from Figs. 1 and 2, wherein the position of the frame with reference to line A B, before and after deflecting, is represented on a larger scale. By this construction, the load on the vehicle is uniformly distributed between the rear end of the front spring and the front and rear ends of the rear springs, the front end of the front spring serving as a yielding or movable pivot for the entire frame, with the result that ease of riding and freedom from shocks are secured for the occupants of the vehicle. Furthermore, when a severe deflection of the springs is produced, either by reason of striking an obstruction or by overload or both, the front end of the frame is always above the rear end thereof, whereby the upward inclination of the frame from rear to front resists the shear between the springs and the axles and lessens the tendency of the body and of the passengers therein to pitch forward when an obstacle is encountered.

Various modifications may be made in my invention without avoiding the spirit thereof, and, while I have necessarily illustrated the same in detail, I do not propose to be limited to the details of construction except as the same may be positively included in the claims hereto annexed and may be rendered necessary by the state of the prior art.

Having described my invention, I claim:

1. A compound vehicle spring comprising a spring both ends of which are adapted for connection with a vehicle frame and a spring having an end flexibly connected to an end of the former spring, the ends of the leaves of the latter spring projecting beyond the central portion of the former spring at varying distances therefrom, the leaf of the latter spring which is adjacent the former spring projecting the greatest distance beyond the center of the former spring, and means for securing the spring members together at the central portion of the former spring, substantially as specified.

2. A compound vehicle spring comprising a spring member both ends of which are adapted for connection with a vehicle frame and a spring member having an end flexibly connected to an end of the former spring, the leaves of the latter spring member extending beyond the center of the former spring member at varying distances therefrom and being staggered with respect to the corresponding ends of the leaves of the former member, means for securing the body portions of said members together, and means for securing the ends of the leaves of the latter spring member to the former spring member, substantially as specified.

3. A vehicle spring member comprising an upper and a lower leaf spring member connected together at their body portions, a flexible connection between one end of said upper spring member and the adjacent end of the lower spring member, the ends of the leaves of the other end of the upper spring member being staggered with respect to the subjacent ends of the leaves of the lower spring member, and means for securing such ends of the upper spring member to the lower spring member, substantially as specified.

4. A vehicle spring comprising two individual spring members, one of said member being a semi-elliptic spring and the other a spring having a scroll end extending around and flexibly connected to one end of the former spring and having its other end terminating short of the corresponding end of the semi-elliptic spring and secured to said semi-elliptic spring, substantially as specified.

5. The combination with a vehicle axle of a compound spring, one end portion of which is constructed as a semi-elliptic spring and the other end portion of which consists of a semi-elliptic spring member and a scroll spring member, the end of the latter member extending around and being flexibly connected to the adjacent end of the former member and means mounted upon the axle for securing the body portions of the spring thereto, substantially as specified.

6. The combination, with a vehicle frame, of a front and a rear side spring therefor, the front end of the front spring being rigidly connected to said frame and the rear end of said spring being flexibly connected to said frame and of greater flexibility than the front end, both ends of the rear spring being of greater flexibility than the front end of the front spring, substantially as specified.

7. The combination, with the frame and axle of a vehicle, of a spring secured to said axle and having one end thereof suitably connected to said frame, the other end of said spring having separate ends, a shackle or link flexibly connecting said separate ends, and a shackle or link connecting the lower end of the former shackle or link to the vehicle-frame, substantially as specified.

8. The combination, with the frame and axle of a vehicle, of a compound spring, one end portion of which is constructed as a single spring and the other end portion having separate ends, one of which ends is formed as a scroll extending around the other end, a link or shackle flexibly connecting said separate ends, and means connecting the ends of the spring to the vehicle frame.

9. The combination with a vehicle frame, of a composite spring, one end of which is made up of a main leaf connected with the frame against longitudinal movement and a plurality of auxiliary leaves, the other end of the spring consisting of an upper and a lower spring, each of which is made up of a main leaf and auxiliary leaves, the ends of both last mentioned springs having a longitudinally movable connection with said frame.

10. The combination with a vehicle frame, of a composite spring, one end of which is made up of a main leaf connected with the frame against longitudinal movement and a plurality of auxiliary leaves, the other end of the spring consisting of an upper and lower spring each of which is made up of a main leaf and auxiliary leaves, the main leaf of the upper spring formed into a scroll which extends beyond below and embraces the forward end of the main leaf of the rear lower spring, the end of both last mentioned springs having longitudinally movable connections with said frame.

11. The combination with a vehicle frame, of a composite spring, one end of which is made up of a main leaf connected with the frame against longitudinal movement and a plurality of auxiliary leaves, the other end of the spring consisting of an upper and a lower spring, each of which is made up of a main leaf and auxiliary leaves, a depending long link having its upper end pivoted to said frame and its lower end pivoted to the end of one of the last mentioned main leaves, and an upwardly projecting short link having one end pivoted to the lower end of the long link, the upper end of the short link pivoted to the end of the other last mentioned main leaf.

12. The combination with a vehicle frame, of a composite spring, the front end of which is made up of a main leaf connected with the front end of the frame against longitudinal movement and a plurality of auxiliary leaves, the rear end of the spring consisting of an upper and a lower spring, each of which is made up of a main leaf and auxiliary leaves, the ends of both last mentioned springs having a longitudinal movable connection with the frame in rear of its front end.

In testimony whereof, I hereunto affix my signature in the presence of two witnesses.

MICHAEL M. McINTYRE.

Witnesses:
J. B. HULL,
CHRISTIAN GIRL.